(12) United States Patent
Takeyama

(10) Patent No.: US 8,498,045 B2
(45) Date of Patent: Jul. 30, 2013

(54) OPTICAL AMPLIFIER

(75) Inventor: Tomoaki Takeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 12/878,253

(22) Filed: Sep. 9, 2010

(65) Prior Publication Data

US 2011/0058251 A1    Mar. 10, 2011

(30) Foreign Application Priority Data

Sep. 10, 2009 (JP) ................... 2009-209163

(51) Int. Cl.
H01S 3/0915 (2006.01)
H01S 3/094 (2006.01)
H01S 3/067 (2006.01)

(52) U.S. Cl.
CPC ....... H01S 3/094023 (2013.01); H01S 3/06766 (2013.01)
USPC ................. 359/341.32; 359/341.31

(58) Field of Classification Search
CPC ............ H01S 3/094023; H01S 3/06766
USPC ................ 359/334, 341.3, 341.31, 341.32, 359/341.33
See application file for complete search history.

(56) References Cited

U.S. PATENT DOCUMENTS

| | | | | |
|---|---|---|---|---|
| 5,191,586 A * | 3/1993 | Huber | ................ | 372/6 |
| 5,283,686 A * | 2/1994 | Huber | ................ | 359/337 |
| 5,907,429 A | 5/1999 | Sugata | | |
| 5,995,275 A * | 11/1999 | Sugaya | ................ | 359/341.3 |
| 6,023,366 A | 2/2000 | Kinoshita | | |
| 6,195,200 B1 * | 2/2001 | DeMarco et al. | ........ | 359/337.21 |
| 6,201,637 B1 * | 3/2001 | Nilsson et al. | .......... | 359/341.33 |
| 6,288,834 B1 * | 9/2001 | Sugaya et al. | ............ | 359/341.1 |
| 6,339,494 B1 * | 1/2002 | Hwang et al. | ............. | 359/337.1 |
| 6,411,431 B2 * | 6/2002 | Sugaya et al. | ............. | 359/341.1 |
| 6,462,862 B2 * | 10/2002 | Kinoshita | ................ | 359/334 |
| 6,504,973 B1 * | 1/2003 | DiGiovanni et al. | .......... | 385/27 |
| 6,507,430 B2 * | 1/2003 | Yenjay | ................ | 359/341.31 |
| 6,549,329 B2 * | 4/2003 | Vail et al. | ................ | 359/334 |

(Continued)

FOREIGN PATENT DOCUMENTS

JP   09-321701   12/1997
JP   10-262032   9/1998

(Continued)

OTHER PUBLICATIONS

Bruyère, F. "Measurement of Polarisation-Dependent Gain in EDFAs Against Input Degree of Polarisation and Gain Compression", Electronics Letters, Mar. 2, 1995 vol. 31 No. 5, 401-403.

(Continued)

Primary Examiner — Mark Hellner
Assistant Examiner — Ari M Diacou
(74) Attorney, Agent, or Firm — Fujitsu Patent Center

(57) ABSTRACT

An optical amplifier includes a rare-earth doped optical fiber for receiving input light through one end and outputting output light through another end, the input light being input from an input port; an excitation light source for generating excitation light; an optical coupler for supplying the generated excitation light to the one end and/or the another end of the rare-earth doped optical fiber; and a reflector for reflecting an amplified spontaneous emission light out of a signal band traveling in opposite direction to the input light, the amplified spontaneous emission light being generated in the rare-earth doped optical fiber.

9 Claims, 14 Drawing Sheets

U.S. PATENT DOCUMENTS

| | | | |
|---|---|---|---|
| 6,658,189 B2 * | 12/2003 | Ajima et al. | 385/123 |
| 6,671,083 B2 * | 12/2003 | Tanaka et al. | 359/334 |
| 6,678,087 B1 * | 1/2004 | Masuda et al. | 359/334 |
| 6,721,088 B2 * | 4/2004 | Brar et al. | 359/334 |
| 6,731,426 B2 * | 5/2004 | Yeniay et al. | 359/341.32 |
| 6,747,788 B2 * | 6/2004 | Kinoshita | 359/334 |
| 6,781,748 B2 * | 8/2004 | Yeniay | 359/341.1 |
| 6,798,945 B1 * | 9/2004 | Pasquale et al. | 385/24 |
| 6,898,003 B2 * | 5/2005 | Hwang et al. | 359/337.5 |
| 6,900,885 B2 * | 5/2005 | Masuda et al. | 356/147 |
| 6,928,227 B2 * | 8/2005 | Shaw et al. | 385/141 |
| 7,027,218 B2 * | 4/2006 | Hwang et al. | 359/341.5 |
| 7,463,411 B2 * | 12/2008 | Demidov et al. | 359/334 |
| 2002/0003655 A1 * | 1/2002 | Park et al. | 359/341.1 |
| 2002/0044344 A1 | 4/2002 | Terahara | |
| 2002/0101652 A1 | 8/2002 | Hayashi et al. | |
| 2002/0109906 A1 * | 8/2002 | Grubb et al. | 359/334 |
| 2002/0118445 A1 * | 8/2002 | Yeniay et al. | 359/341.1 |
| 2002/0141045 A1 | 10/2002 | Inagaki et al. | |
| 2003/0063372 A1 * | 4/2003 | Yeniay | 359/341.1 |
| 2003/0133183 A1 * | 7/2003 | Yeniay et al. | 359/349 |
| 2003/0137722 A1 * | 7/2003 | Nikolajsen et al. | 359/341.1 |
| 2003/0161033 A1 * | 8/2003 | Hwang et al. | 359/341.3 |
| 2004/0179797 A1 * | 9/2004 | Po et al. | 385/123 |
| 2004/0212874 A1 * | 10/2004 | Kim et al. | 359/334 |
| 2004/0233516 A1 * | 11/2004 | Hwang et al. | 359/349 |
| 2004/0246567 A1 * | 12/2004 | Ahn et al. | 359/337 |
| 2005/0012986 A1 * | 1/2005 | Kakui | 359/333 |
| 2005/0099675 A1 * | 5/2005 | Lee et al. | 359/341.3 |
| 2005/0105169 A1 * | 5/2005 | Hwang et al. | 359/341.1 |
| 2005/0105171 A1 * | 5/2005 | Shin et al. | 359/344 |
| 2005/0122573 A1 * | 6/2005 | Kim et al. | 359/341.1 |
| 2005/0141077 A1 * | 6/2005 | Kim et al. | 359/333 |
| 2005/0179992 A1 * | 8/2005 | Shimizu et al. | 359/337 |
| 2006/0029111 A1 * | 2/2006 | Liu | 372/6 |
| 2006/0050368 A1 * | 3/2006 | Chung et al. | 359/344 |
| 2010/0284061 A1 * | 11/2010 | Nicholson | 359/334 |
| 2011/0134512 A1 * | 6/2011 | Ahn et al. | 359/341.3 |

FOREIGN PATENT DOCUMENTS

| | | |
|---|---|---|
| JP | 11-145533 | 5/1999 |
| JP | 11-307855 | 11/1999 |
| JP | 2002-232044 | 8/2002 |
| JP | 2002-232048 | 8/2002 |
| JP | 2002-252399 | 9/2002 |
| JP | 2007-012767 | 1/2007 |

OTHER PUBLICATIONS

Davidson, C. R. et al., "Spectral Dependence of Polarization Hole-Burning", Optical Fiber Communication Conference and Exposition and The National Fiber Optic Engineers Conference, Technical Digest (CD) Mar. 5, 2006.

Greer, E. J. et al., "Polarisation Dependent Gain in Erbium-Doped Fibre Amplifiers", Electronics Letters, Jan. 6, 1994 vol. 30 No. 1, 46-47.

Sudo, Shoichi "Erbium Doped Optical Fiber Amplifier", Ch.1, Sec.2, Para.4.2, L.8, L, P59-P60 and Figs.28,29 Nov. 21, 1999, 59-61 English language partial translation.

Japanese Office Action mailed May 7, 2013 for corresponding Japanese Application No. 2009-209163, with partial English-language translation.

* cited by examiner

OPTICAL AMPLIFIER

CROSS-REFERENCE TO RELATED APPLICATION

This application is based upon and claims the benefit of priority from the prior Japanese Patent Application No. 2009-209163 filed on Sep. 10, 2009, the entire contents of which are incorporated herein by reference.

FIELD

The embodiments discussed herein are related to an optical amplifier using rare-earth doped optical fiber.

BACKGROUND

A relay station in an optical transmission system included in an optical communication network uses an optical amplifier that performs signal amplification directly on light in order to support higher velocities of (or wider bands for) optical signals instead of regenerative relay involving photoelectric conversion. Optical amplifiers presently generally used are optical amplifiers using rare-earth doped optical fiber as their amplifying medium. Among them, an optical amplifier (erbium doped fiber amplifier: EDFA) using erbium doped optical fiber (EDF) as its amplifying medium is mainly used.

FIGS. 15A and 15B illustrate a general EDFA. The EDFA illustrated in FIG. 15A includes an EDF 1a receiving input light O1 through one end, an excitation light source 2a that generates excitation light by using a laser diode (LD), and an optical coupler (such as a wavelength division multiplexing coupler or WDM coupler) 3a that provides excitation light from the excitation light source 2a from the one end to the EDF 1a. The EDFA applies front-pumping that transmits and amplifies excitation light that travels in the same direction as the direction of travel of the input light O1 to the EDF 1a. The EDFA illustrated in FIG. 15B includes an EDF 1b that receives input light through one end, an excitation light source 2b that generates excitation light by using a laser diode, for example, and an optical coupler 3b that provides excitation light from the excitation light source 1b to the EDF 1b through the other end of the EDF 1b. The EDFA applies back-pumping that transmits and amplifies excitation light that travels in the opposite direction of the direction of travel of the input light to the EDF 1b. In addition, bidirectional pumping EDFAs have excitation light sources both at the front and rear and excite an EDF bidirectionally.

As illustrated in FIG. 15A, during amplification by the EDF 1a, amplified spontaneous emission A1 occurs traveling in the opposite direction of the direction of travel of the input light O1. In order to suppress the reverse movement of the amplified spontaneous emission A1, an optical isolator may be provided. The same is also true for the EDF 1b and an EDFA of bidirectional pumping in FIG. 15B.

When such an EDFA is used to relay amplify an optical signal, polarization hole-burning (PHB) may occur in the EDF, a polarization dependent gain (PDG) may occur. Particularly, in a system having many relay stations using EDFAs on a transmission path, the effects of the polarization dependent gains relative to the EDFAs in the relay stations are accumulated. For example, when a signal band of C-band (1550 nm band: 1530 nm to 1565 nm) is relay amplified, the optical Signal-to-Noise ratio (OSNR) of the signal component on the short-wavelength side in the C-band may deteriorate unignorably. A signal band is a band in operation signal(s) that is continuously arranged wavelength(s) included in an input light. The input light includes at least one signal band. In recent optical networks, the transmission distances of both submarine and ground transmissions have increased. With the increases, the number of relays relative to optical amplifiers tends to increase. Solving the problems on the effects of the polarization dependent gains in the optical amplifiers now is important for the future.

Polarization hole-burning is a phenomenon having a gain that varies depending on the excitation light input to an EDF and the polarized state of signal light. When signal light with high intensity and degree of polarization (DOP) is input to an EDF, polarization hole-burning trims the gain of light in the parallel direction of polarization to the direction of polarization of the input signal light. The variation in gain in the EDF also affects amplified spontaneous emission (ASE) occurring in the EDF. The amplified spontaneous emission is unpolarized light and contains a parallel polarized component and a perpendicular polarized component to the direction of polarization of the signal light. Thus, the parallel polarized component to the signal light in the amplified spontaneous emission is affected by the gain variations due to the polarization hole-burning.

In other words, the polarization hole-burning occurring trims the gain of signal light and the gain of the polarized component parallel to the signal light in the amplified spontaneous emission. On the other hand, the polarization hole-burning occurring does not trim the gain of the polarized component perpendicular to signal light in the amplified spontaneous emission. Thus, regarding the amplified spontaneous emission occurring in an EDF, the difference between the gain relative to the polarized component parallel to the signal light with high degree of polarization and the gain relative to the polarized component perpendicular to the signal light is the polarization dependent gain. Therefore, comparing with the case without polarization hole-burning, the relative increase in proportion of the polarized component perpendicular to the signal light in the amplified spontaneous emission results in the reduction of the OSNR of the output light after the amplification. In other words, the signal light having a wavelength on the short-wavelength side of a C-band with high intensity and degree of polarization is affected by the polarization dependent gain due to polarization hole-burning. As a result, the OSNR after amplification decreases.

The polarization dependent gain due to polarization hole-burning depends on the degree of polarization of the light in an EDF. The higher the degree of polarizations, the more significantly the polarization hole-burning occurs. The term, "degree of polarization" refers to the ratio of optical power of a completely polarized component to the total optical power of light of the focused wavelength. The degree of polarization "0" indicates an unpolarized state, while the degree of polarization "1" indicates a completely-polarized state.

In a wavelength division multiplexing (WDM) optical transmission system that is a mainstream of the present optical communication, signal light beams having many wavelengths may be multiplexed for transmission, In this case, since the multiplexed signal light beams have various degrees of polarization, the degree of polarization of the entire WDM light is low. Thus, the influence of polarization hole-burning on polarization dependent gains is ignorably small. However, when a small number of signal light beams are to be multiplexed, for example, when signal light having one wavelength is only to be transmitted and particularly when the signal light positions on the short-wavelength side of the C-band, the influence as described above of polarization hole-burning on the polarization dependent gains become significant and unignorable.

The deterioration of the OSNR due to the polarization dependent gain when a small number of signal light beams are to be multiplexed will be described with reference to FIG. 15A. In the EDFA in FIG. 15A, it is assumed that input light O1 containing signal light S of one wave positioned on the short-wavelength side of the C-band and noise light N1 over the entire C-band is input to the EDFA. In this case, the input light O1 before amplification has an OSNR based on the power of a signal component in signal light wavelengths and the power of a noise component.

When the degree of polarization of the signal light S contained in the input light O1 is high, it is influenced by the polarization dependent gain due to the polarization hole-burning during the amplification in the EDF 1a. As a result, in the output light O2 after the amplification by the EDF 1a, the proportion of the noise component N2 increases particularly near the wavelength of the signal light S, and the OSNR relative to the signal light S decreases.

The OSNR may decrease for the same cause even with EDFAs of back-pumping in FIG. 15B and bidirectional pumping, not illustrated. In view of these situations, it may be important to suppress a polarization dependent gain in an optical amplifier applying rare-earth doped optical fiber.

The followings are reference documents.
[Document 1] Shoichi Sudo, "*Erbium Doped Optical Fiber Amplifier*", The Optronics Co., Ltd., P. 59 to 61.
[Document 2] F. Bruyère, "*Measurement of polarisation-dependent gain in EDFAs against input degree of polarisation and gain compression*", ELECTRONICS LETTERS 2 Mar. 1995 Vol. 31 No. 5, pp. 401-403.

SUMMARY

According to an aspect of the embodiment, an optical amplifier includes a rare-earth doped optical fiber for receiving input light through one end and outputting output light through another end, the input light being input from an input port; an excitation light source for generating excitation light; an optical coupler for supplying the generated excitation light to the one end and/or the another end of the rare-earth doped optical fiber; and a reflector for reflecting an amplified spontaneous emission light out of a signal band traveling in opposite direction to the input light, the amplified spontaneous emission light being generated in the rare-earth doped optical fiber.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
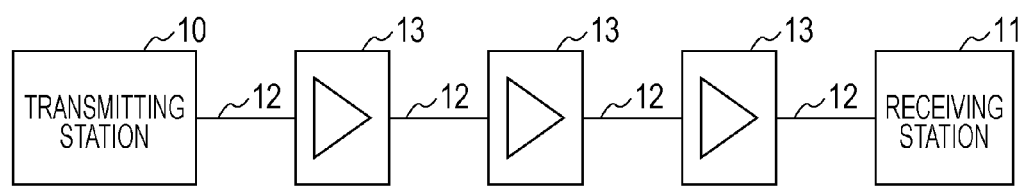
FIG. 1 is a block diagram illustrating an example of an optical transmission system including optical amplifiers in relay stations.

FIG. 1 illustrates an example of an optical transmission system including optical amplifiers in relay stations. A transmitting station 10 and a receiving station 11 are connected via an optical fiber transmission path 12. Many relay stations 13 are provided on the optical fiber transmission path 12. Each of the relay stations 13 includes an optical amplifier and amplifies and relays an optical signal transmitted on the optical fiber transmission path 12. The optical signal communicated between the transmitting station 10 and the receiving station 11 is WDM light or signal light of simple waves.

Figure 2A:
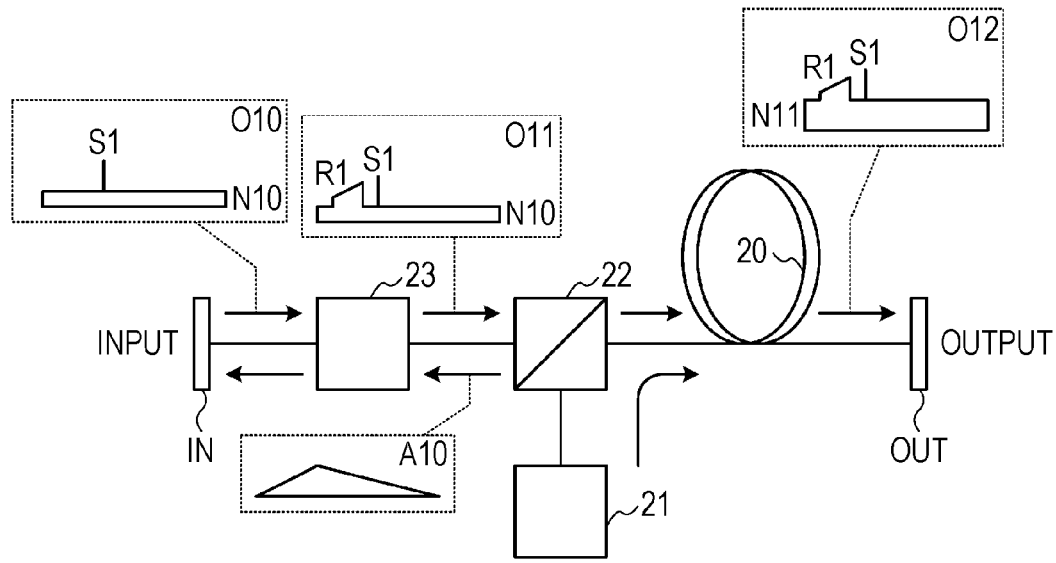
FIGS. 2A and 2B are block diagrams illustrating a first embodiment of an optical amplifier.
Figure 2B:
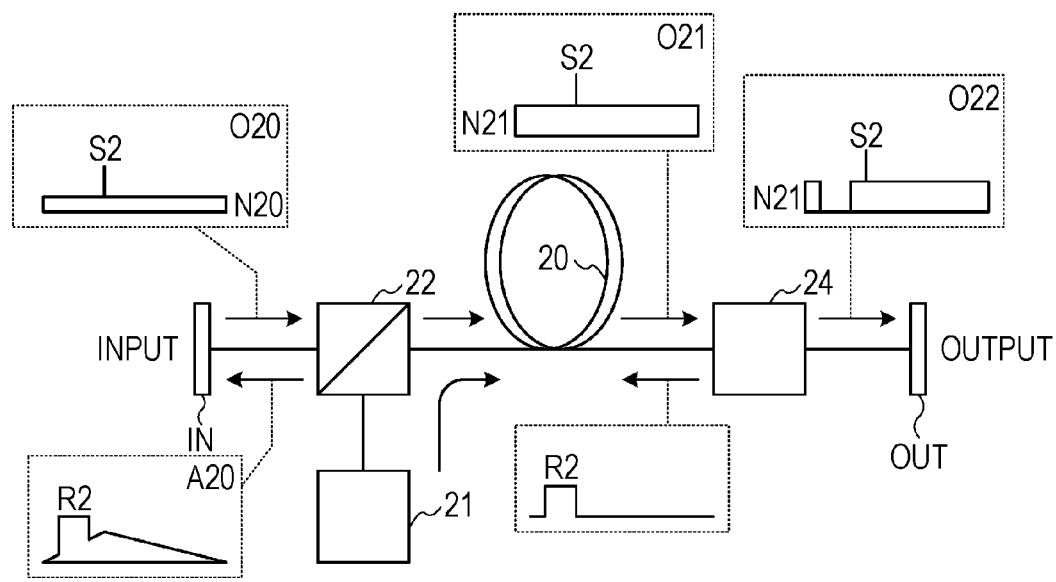

FIGS. 2A and 2B illustrate a first embodiment of an optical amplifier applicable to the relay stations 13 in the optical transmission system. FIGS. 2A and 2B illustrate a front-pumping EDFA.

The EDFA illustrated in FIG. 2A includes EDF 20 that is rare-earth doped optical fiber having one end (input end) to which input light incident on an input port IN is input. The EDFA includes an excitation light source 21 that generates excitation light for exciting erbium doped to the EDF 20 and an optical coupler 22 that supplies the excitation light by the excitation light source 21 to the input end of the EDF 20. The excitation light source 21 may be a laser diode that generates excitation light having a wavelength of 0.98 µm or 1.48 µm, for example. The optical coupler 22 may be a WDM coupler provided on the light path between the input port IN and the input end of the EDF 20, for example.

A reflector 23 is also provided on the light path between the input port IN and the input end of the EDF 20. The reflector 23 reflects light out of a signal band in the amplified spontaneous emission (backward ASE) that is generated in the EDF 20 and travels (or moves backward) toward the input port IN to the EDF 20. In the example illustrated in FIG. 2A, the reflector 23 is provided between the input port IN and the optical coupler 22. However, it may be provided between the optical coupler 22 and the EDF 20.

The reflector 23 may be an optical filter, for example, and allows all bands of the input light that travels from the input port IN to the EDF 20 to pass through. On the other hand, in the amplified spontaneous emission generated by the EDF 20 and moving backward to the input port IN, the reflector 23 reflects a light of out of a signal band to the EDF 20 and allows the light components excluding that of the predetermined band to pass through. An out band of the signal band to be reflected by the reflector 23 is the band with polarization hole-burning occurring in the EDF 20 and near the wavelength of the signal light.

Figure 3:
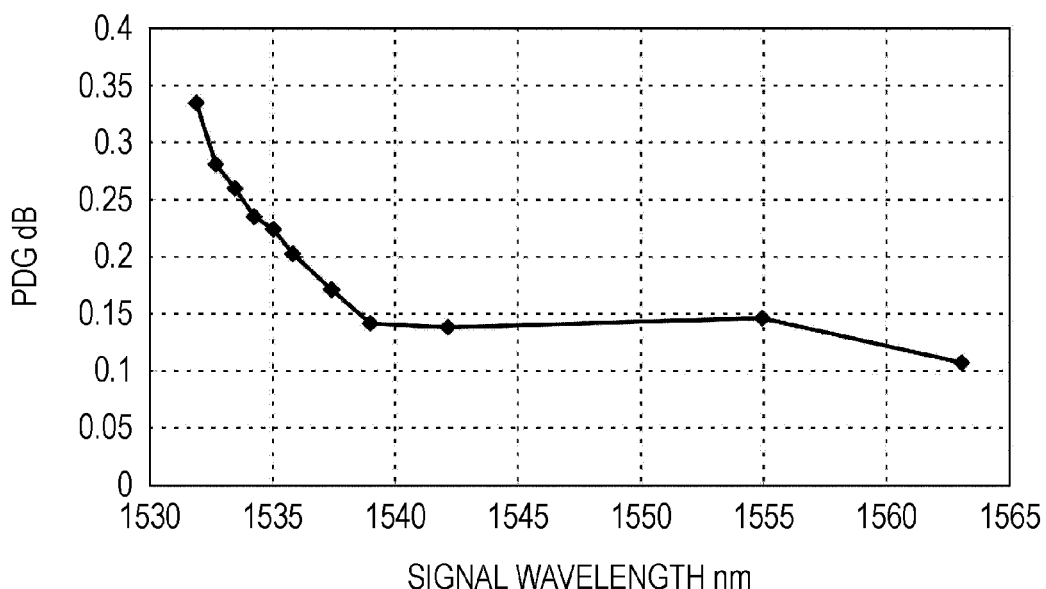
FIG. 3 is a graph illustrating a relationship between polarization dependent gain in an EDF and wavelength.

In an optical transmission system having EDFAs applying the EDF 20 in the relay stations 13, a C-band including a radiation peak wavelength of the EDF 20 may be used as the band for WDM light. On the 1550 nm C-band, the radiation peak wavelength of the EDF 20 positions on the short-wavelength side, and the polarization dependent gain due to polarization hole-burning occurs significantly on the short-wavelength side. FIG. 3 is a graph of polarization dependent gain (PDG) on the vertical axis against signal wavelength (nm) on the horizontal axis. As illustrated on the graph, the polarization dependent gain (PDG) in the EDF 20 rapidly increases at or under 1540 nm and has a peak near 1530 nm. Thus, when the wavelength of signal light contained in the input light at the C-band positions on the short-wavelength side, the OSNR is deteriorated due to the influence of the polarization dependent gain.

On the other hand, the amplified spontaneous emission in the opposite direction generated in the EDF 20 to which excitation light is supplied has a spectrum spreading having a peak near 1530 nm and has a band containing the C-band of 1530 nm to 1565 nm. The amplified spontaneous emission generated and traveling backward in the EDF 20 is considered to generate in the following process. First, excitation light of front pumping enters through the input end of the EDF 20. This increases the inverted distribution ratio (at the excited state) of erbium near the input end in the EDF 20. When the inverted distribution ratio increases in the EDF 20, amplified spontaneous emission is more generated in the bands on the short-wavelength side of the C-band. In the generated amplified spontaneous emission, the amplified spontaneous emission traveling to the input end of the EDF 20 is amplified within the EDF 20 and exits through the input end of the EDF 20. The exited amplified spontaneous emission is amplified spontaneous emission at the unpolarized state that travels in the opposite direction of the input light and exhibits a spectrum form in which the power reaches a maximum peak near the radiation peak wavelength in the EDF 20 on the short-wavelength side of C-band.

In FIG. 2A, a part of the bands of the amplified spontaneous emission at the unpolarized state that moves backward is reflected by the reflector 23 and is input to the EDF 20. The band reflected by the reflector 23 is a band having polarization hole-burning in the EDF 20 and is near the wavelength of signal light. The input of the amplified spontaneous emission of the reflected band to the EDF 20 reduces the degree of polarization of the band having polarization hole-burning in the input light containing the signal light positioning on the short-wavelength side of the C-band and travels in the forward direction in the EDF 20. Thus, in the EDF 20, the polarization dependent gain affected by polarization hole-burning may be suppressed.

It is assumed here that the predetermined band reflected by the reflector 23 is a band near the wavelength of signal light on the short-wavelength side and not containing the wavelength of signal light.

The avoidance of the wavelength of signal light is preferable since the ratio of the signal component to the noise component in the wavelength is deteriorated if it is contained. As disclosed in Document 3, the hole width of polarization hole-burning in EDF is in a range of about ±6 nm of the focused wavelength. Thus, the band near the wavelength of signal light is preferably the wavelength to be amplified of the signal light±6 nm specifically in the EDF 20. Particularly, the shorter the wavelength is in the C-band in the EDF 20, the more significant the polarization hole-burning is. Thus, instead of signal light contained in the input light, reflecting the amplified spontaneous emission in bands on the short-wavelength side is more effective. In other words, the reflector 23 reflects amplified spontaneous emission in a band of a wavelength of signal light−6 nm and not containing a wavelength of signal light.

[Document 3] C. R. Davidson, et al., "*Spectral Dependence of Polarization Hole-Burning*", Optical Fiber Communication Conference and Exposition and The National Fiber Optic Engineers Conference, Technical Digest (CD), Optical Society of America, 2006, paper OThC3.

Since the ±6 nm band varies in accordance with the type of rare earth doped to optical fiber being an amplifying medium, the band is properly designed in accordance with the type of rare-earth doped optical fiber to be used in the optical amplifier. In other words, the ±6 nm band refers to a band corresponding to the hole width of polarization hole-burning depending on the doped rare earth.

FIG. 2A schematically illustrates waveforms of light at the fundamental parts of the EDFA. For example, it is assumed that signal light 51 of one wave with the shortest wavelength of the C-band and input light O10 containing noise light N10 all over the C-band are input to the EDFA. In this case, the input light O10 before amplification has an OSNR based on the power of the signal component in the signal light wavelengths and the power of noise component.

When the degree of polarization of signal light 51 contained in the input light O10 is high, the OSNR may be influenced by the polarization dependent gain due to the polarization hole-burning in the EDF 20. The EDFA in FIG. 2A includes the reflector 23 in order to suppress the polarization hole-burning. As described above, the reflector 23 reflects the band with polarization hole-burning and on the shorter-wavelength side than the wavelength of the signal light 51 (such as signal light wavelength−6 nm) in the amplified spontaneous emission A10 that moves backward. Thus, the input light O10 having passed through the reflector 23 is coupled with the light R1 reflected by the reflector 23 to input light O11 that contains the reflected light R1 at a predetermined band of the amplified spontaneous emission A10 at the unpolarized state on the shorter-wavelength side than signal light S1.

The input light O11 containing the reflected light R1 sequentially passes through the optical coupler 22 and is input to the EDF 20 having the input end receiving excitation light by the excitation light source 21. The input light O11 propagating in the EDF 20 has a lower degree of polarization at the band having polarization hole-burning occurring near the wavelength of the signal light S1 because of the reflected light R1 at the unpolarized state. Thus, the occurrence of polarization hole-burning may be suppressed, and the polarization dependent gain may be suppressed. As a result, the output light O12 output from the EDF 20 has a noise component N11 suppressed from increasing near the wavelength of signal light S1, and the OSNR relative to the signal light S1 is improved.

Simulation results with specific numerical values are illustrated in FIGS. 4 to 7. First of all, it is assumed that, in the EDFA in FIG. 2A, signal light S1 at wavelengths of 1531.9 nm to 1563 nm may be contained in the input light O10 at the C-band. The EDFA is an EDFA for transmitting WDM light by which the number of wavelengths of the signal light S1 may vary from 1 to 40 waves. It is assumed that the signal light S1 input to the EDFA power is −20 dBm, and the amplification gain of the EDF 20 is 24 dB. It is further assumed that the power of the signal light S1 to be output is 4 dBm, the entire length of the EDF 20 is 6 m, and the wavelength of the excitation light by the excitation light source 21 is 0.98 μm. It is further assumed that the power of the excitation light is controlled such that the gain may be 24 dB.

Figure 4:
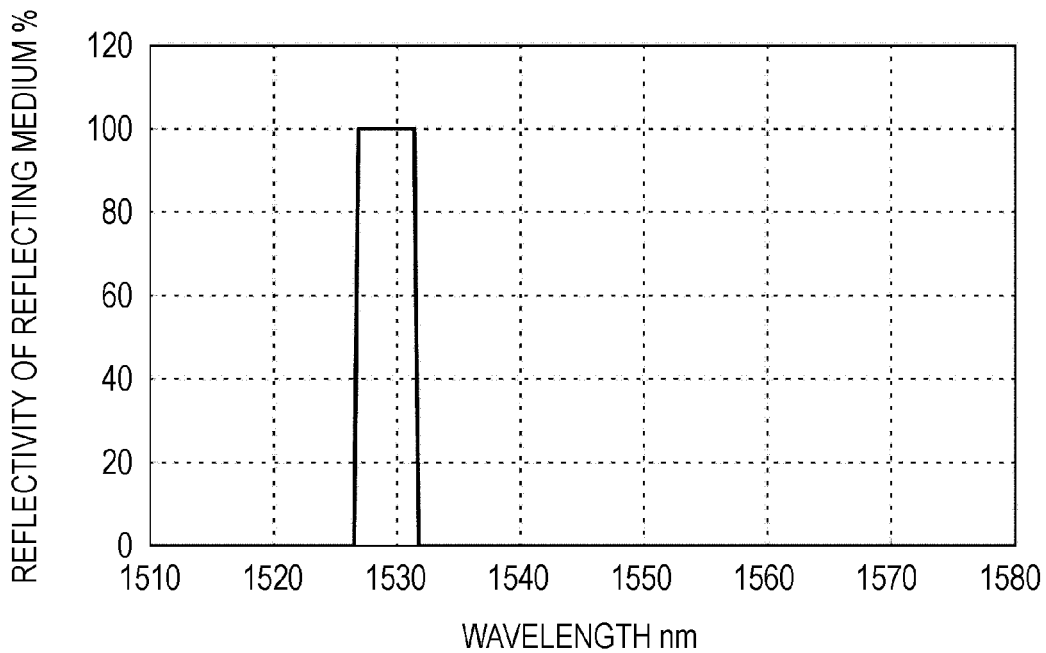
FIG. 4 is a graph illustrating a reflection characteristic of a reflector.

On the basis of the characteristic of polarization hole-burning in the EDF 20, that is, the characteristic that the polarization hole-burning is significant when the degree of polarization at bands of the signal light wavelength±6 nm is high and on the short-wavelength side of the C-band, the reflector 23 reflects the amplified spontaneous emission A10 on the shorter-wavelength side than 1531.9 nm of the signal light S1 with the shortest wavelength and at near bands of 1531.4 nm or below. The reflection of amplified spontaneous emission at 1531.9 nm is avoided since it may increase the noise component right under signal light. It is defined that the reflected band at or under 1531.4 nm is 1525.9 nm that is a range of −6 nm affecting the polarization hole-burning. The reflection characteristic of the reflector 23 is illustrated in FIG. 4. FIG. 4 is a graph having reflectivity of a reflecting medium to be used in the reflector 23 on the vertical axis and wavelength on the horizontal axis. The reflector 23 reflects the amplified spontaneous emission A10 at bands at and under 1531.4 nm to below and at 1525.9 nm and above.

When the bands to be reflected by the reflector 23 are too narrow, the effect of suppressing polarization hole-burning is low. When the bands are excessively extended to the long wavelength wide, the excitation light for amplifying the reflected light (amplified spontaneous emission) is used wastefully, and the noise figure (NF) significantly deteriorates in the entire WDM light over the advantage of suppression of polarization hole-burning. Thus, as described above, proper reflection bands are defined in accordance with the type of rare earth to be doped to the amplifying medium and the wavelength of the light focused.

Figure 5:
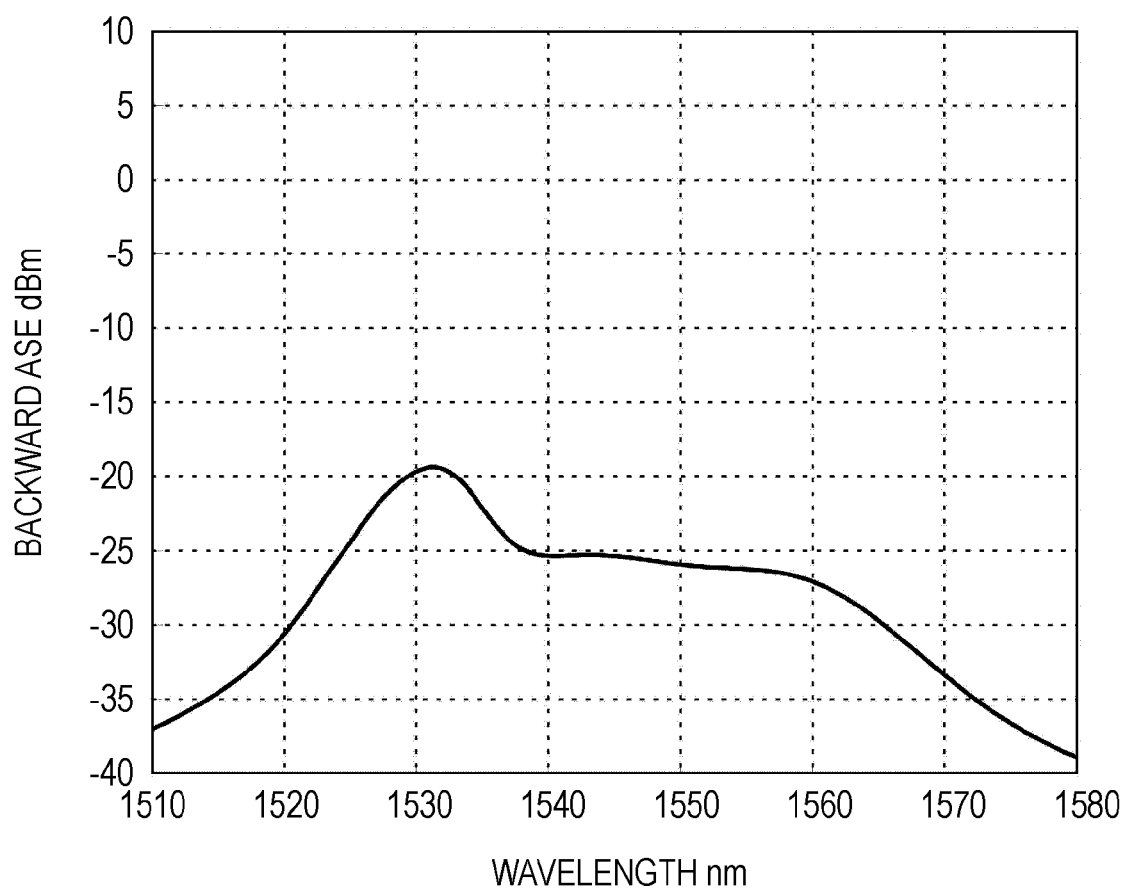
FIG. 5 is a graph illustrating a spectrum form of backward amplified spontaneous emission occurring in EDF.

It is assumed that the EDFA including the reflector 23 having the characteristic in FIG. 4 receive the input light O10 containing signal light S1 of one wavelength of 1531.9 nm. When, in the EDFA, excitation light by the excitation light source 21 is fed to the EDF 20, backward amplified spontaneous emission (backward ASE) having a spectrum form illustrated in FIG. 5 is emitted from the input end of the EDF 20 to the input port IN. FIG. 5 illustrates a graph having power of amplified spontaneous emission on the vertical axis and wavelength on the horizontal axis. The amplified spontaneous emission A10 moving backward has a spectrum spreading having a peak in the vicinity of 1530 nm near the radiation peak wavelength of the EDF 20 and has a band including the C-band of 1530 nm to 1565 nm. The total power of the amplified spontaneous emission A10 is −3.0 dBm.

Figure 6:
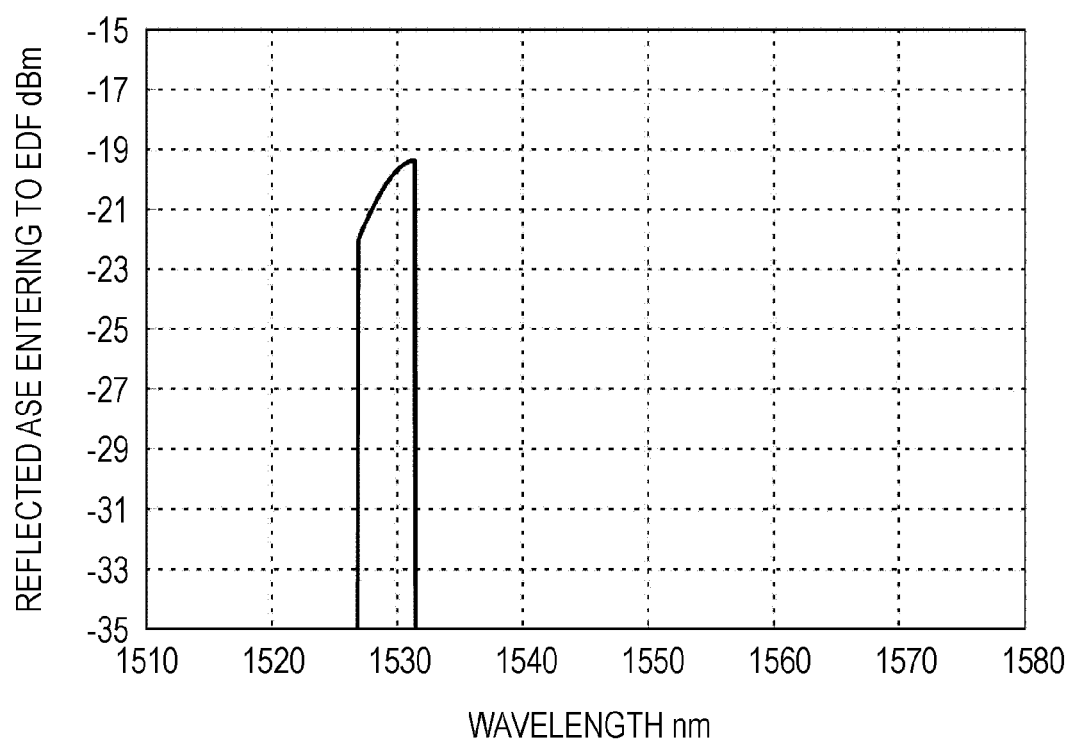
FIG. 6 is a graph illustrating a spectrum form of reflected light by a reflector.

The amplified spontaneous emission A10 moving backward in FIG. 5 reaches the reflector 23 having the characteristic in FIG. 4, the band illustrated in FIG. 6 is reflected. In other words, in the amplified spontaneous emission A10 having the spectrum form in FIG. 5, a band of 1525.9 nm to 1531.4 nm is reflected, resulting in the reflected light R1 toward the EDF 20. FIG. 6 is a graph having the power of reflected light on the vertical axis and wavelength on the horizontal axis. The total power of the reflected light R1 by the reflector 23 is −9.1 dBm.

Figure 7:
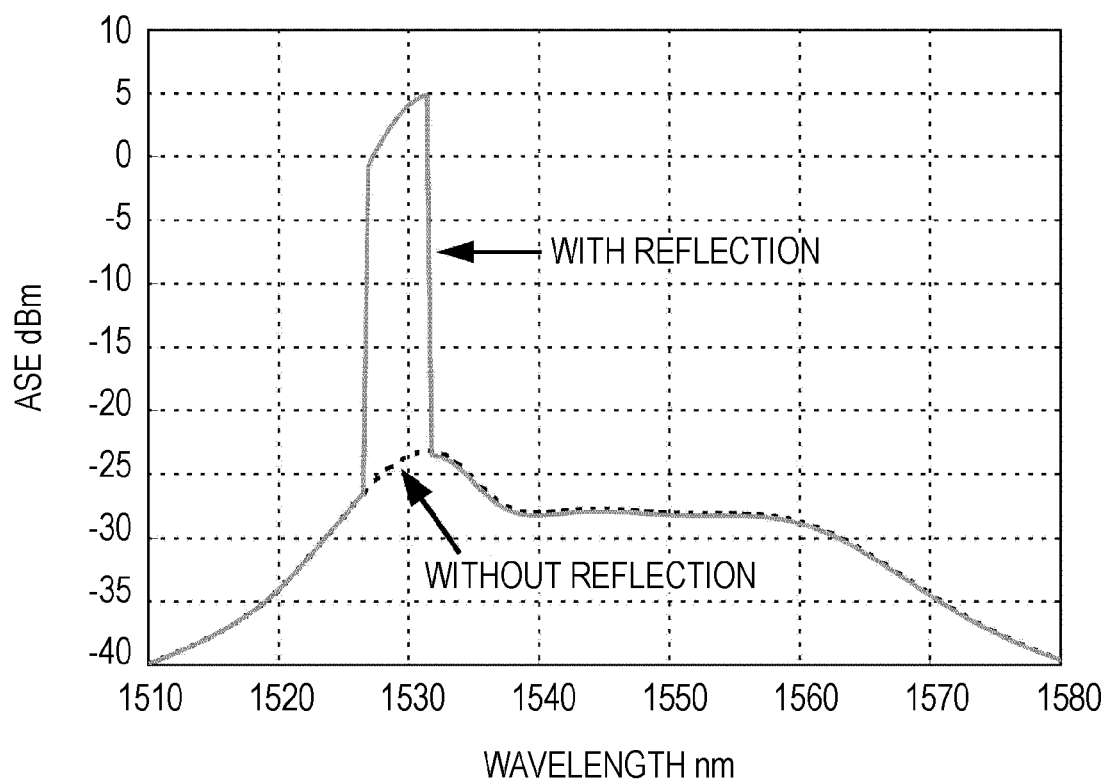
FIG. 7 is a graph illustrating a spectrum form of forward amplified spontaneous emission output from EDF.

Since the reflected light R1 in FIG. 6 by the reflector 23 is input to the EDF 20 along with the input light O10, the input light O11 containing the signal light 51 of −20 dBm and the reflected light R1 of −9.1 dBm is input to the input end of the EDF 20. The inclusion of the reflected light R1 at a band having polarization hole-burning in the EDF 20 and near the wavelength of the signal light 51 may reduce the degree of polarization from 100% to 8% in the vicinity of the signal light 51 input to the EDF 20 and may suppress the polarization dependent gain due to polarization hole-burning from 0.20 dB to 0.01 dB. The spectrum form of the forward amplified spontaneous emission output from an output terminal of the EDF 20 in this case is as illustrated in FIG. 7. FIG. 7 is a graph having the power of amplified spontaneous emission on the vertical axis and wavelength on the horizontal axis. In FIG. 7, the power at a band of 1525.9 nm to 1531.4 nm of the reflected light R1 by the reflector 23 protrudes.

FIG. 2B illustrates a variation example in which the position of the reflector is changed in an EDFA of front-pumping like FIG. 2A. The configuration excluding the position of the reflector is the same as the EDFA in FIG. 2A. In the EDFA in FIG. 2B, a reflector 24 is provided closely to an output terminal (the other end) of the EDF 20 and reflects a predetermined band of output light and allows the band excluding the reflection band to pass through. In other words, the reflector 24 is provided on a light path between an output terminal and an output port OUT of the EDF 20 and reflects a partial band of output light to move backward to the output end of the EDF 20. The reflection band of the reflector 24 is the same as the reflection band of the reflector 23 and is a band having polarization hole-burning occurring in the EDF 20 and near the wavelength of the signal light contained in input light band.

FIG. 2B schematically illustrates waveforms of light at fundamental parts of the EDFA. For example, it is assumed that signal light S2 of one wave with the shortest wavelength of the C-band and input light O20 containing noise light N20 all over the C-band are input to the EDFA. In this case, the input light O20 before amplification has an OSNR based on the power of the signal component in the signal light wavelengths and the power of noise component.

The input light O20 passes through the optical coupler 22 and is input to the EDF 20 along with excitation light by the excitation light source 21. When the degree of polarization of signal light S2 contained in the input light O20 is high, the OSNR may be influenced by the polarization dependent gain due to the polarization hole-burning in the EDF 20. The EDFA in FIG. 2B includes the reflector 24 in order to suppress the polarization hole-burning. The reflector 24 reflects, in the light output from the EDF 20, the same band as the reflection band of the reflector 23 in FIG. 2A, that is, the band with polarization hole-burning and on the shorter-wavelength side than the wavelength of the signal light S2 (such as signal light wavelength−6 nm). The reflected light R2 moving backward is input to the EDF 20 through the output terminal. The reflected light R2 is unpolarized light since it is resultant of the reflection of a noise component containing amplified spontaneous emission occurring in the EDF 20.

Within the EDF 20, the input light O20 is input through the input end, and the reflected light R2 is input through the output terminal. As a result, the input light O20 propagating through the EDF 20 has a lower degree of polarization at the band having polarization hole-burning occurring near the wavelength of the signal light S2 because of the reflected light R2 at the unpolarized state. Thus, the occurrence of polarization hole-burning in the EDF 20 may be suppressed, and the polarization dependent gain may be suppressed. Therefore, the output light O21 output from the EDF 20 has a noise component N21 suppressed from increasing near the wavelength of signal light S2, and the OSNR relative to the signal light S2 is improved.

The output light O21 passes through the reflector 24, results in output light O22 excluding the reflection band trimmed from the noise component N21 and exits through the output port OUT. The reflected light R2 by the reflector 24 is amplified through the EDF 20, is then output through the input end of the EDF 20 along with backward amplified spontaneous emission A20 and moves to the input port IN.

Comparing the front-pumping EDFA shaving the reflector 23 on the input side as illustrated in FIG. 2A and having the reflector 24 on the output side as illustrated in FIG. 2B, the EDFA in FIG. 2A has a higher effect of suppression of polarization hole-burning. As disclosed in Document 4, the higher the optical power in the EDF 20 is, the more significantly polarization hole-burning occurs.

Figure 8A:
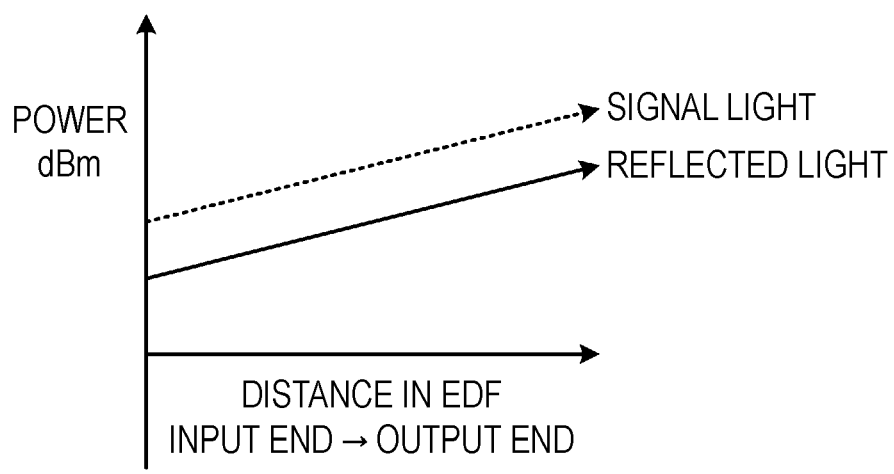
FIGS. 8A and 8B are graphs illustrating power of signal light and reflected light based on the distance in EDF.
Figure 8B:
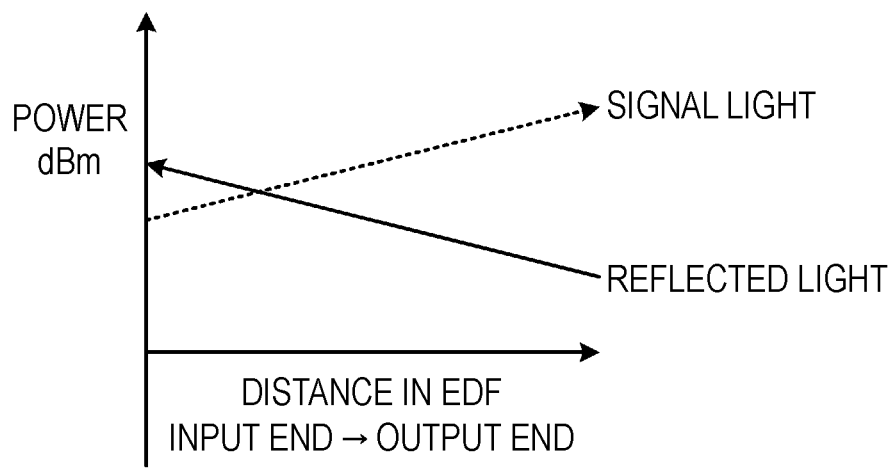

Referring to the graph having the distance from the input end to the output terminal in the EDF 20 on the horizontal axis and optical power on the vertical axis, the signal light power increases after amplification as the distance to the output terminal of the EDF 20 decreases, as illustrated in FIGS. 8A and 8B. From this, it mat be said that polarization hole-burning occurs significantly near the output terminal. Therefore, it is highly effective to lower the degree of polarization near the output terminal having high signal light power.

FIG. 8A is a graph in the EDF 20 in FIG. 2A. The reflected light in FIG. 8A is input to the input end and travels toward the output terminal, like signal light. Thus, the power increases after amplification as the distance to the output terminal decreases. On the other hand, FIG. 8B is a graph in the EDF 20 in FIG. 2B. The reflected light illustrated in FIG. 8B is input through the output terminal and travels toward the input end. Thus, the power increases after amplification as the distance to the input end decreases. In other words, as seen from the comparison between both of them, it may be said that the EDFA in FIG. 2A having higher reflected light power near the output terminal of the EDF 20 where the signal light power increases has a higher effect of suppression of polarization hole-burning.

[Document 4] E. J. Greer, et al., "*Polarisation dependent gain in erbium doped fibre amplifiers*", ELECTRONICS LETTERS 6th January Vol. 30, No. 1, pp. 46-47.

Figure 9:
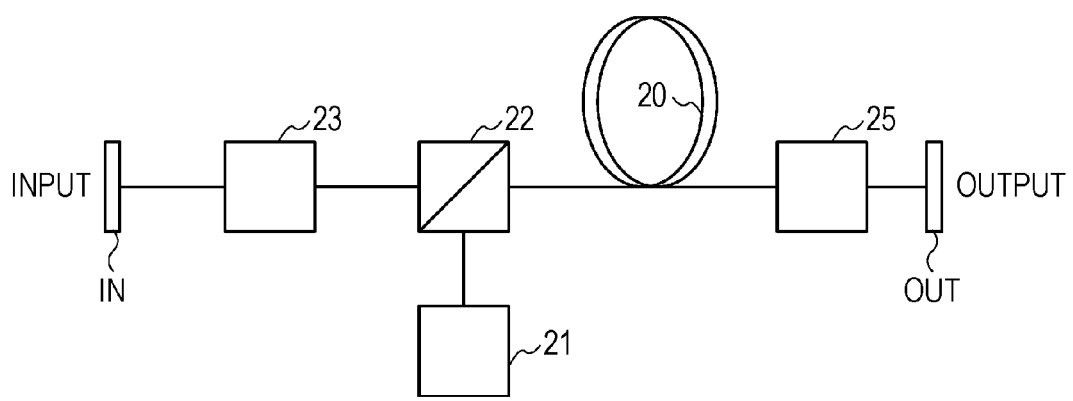
FIG. 9 is a block diagram illustrating a variation example of an optical amplifier according to a first embodiment.

FIG. 9 illustrates another variation example of the EDFA in FIG. 2A. The EDFA in FIG. 9 has the same EDF 20, excitation light source 21, optical coupler 22 and reflector 23 as those in FIG. 2A and further includes an optical filter 25 on a light path between output terminal and output port OUT of the EDF 20. The optical filter 25 blocks the transmission of light with the reflection band of the reflector 23. The optical filter 25 deters the reflected light component contained in amplified spontaneous emission output in the forward direction from the EDF 20 as illustrated in FIG. 7. In other words, when, in the EDF 20, the power of signal light and the power of reflected light are amplified and if the amplified reflected light power is unignorably higher than the signal light power, the influence on the precision of detection of a monitor photodiode, not illustrated, that detects the output power of the EDFA may be concerned. Thus, the optical filter 25 is preferably provided to suppress the reflected light power.

Figure 10A:
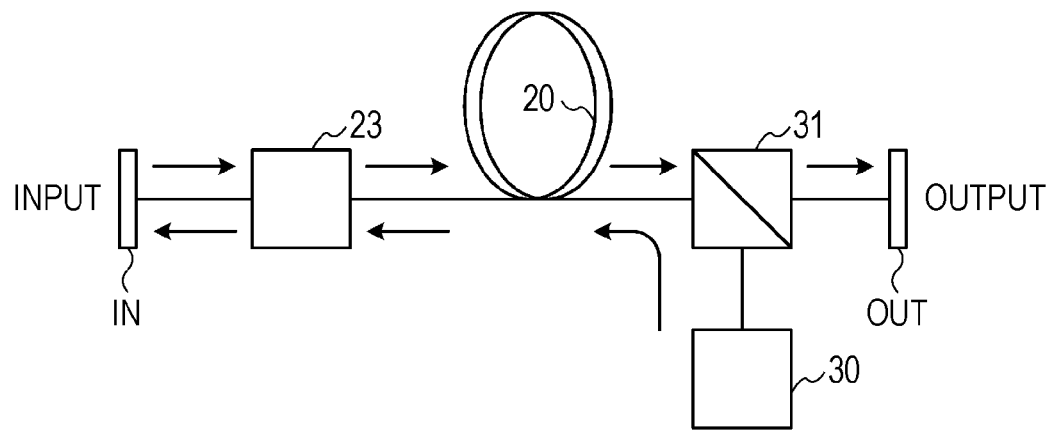
FIGS. 10A and 10B are block diagrams illustrating an optical amplifier according to a second embodiment.
Figure 10B:
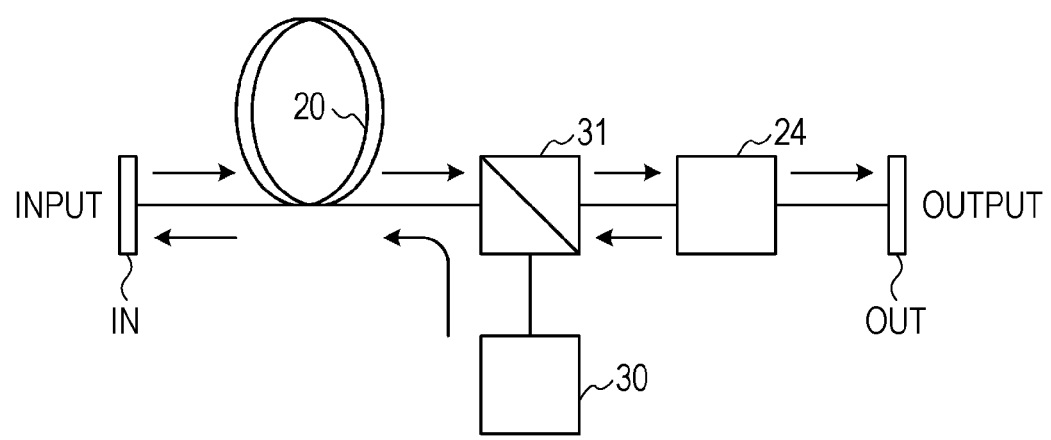

FIGS. 10A and 10B illustrate EDFAs of back-pumping according to a second embodiment of an EDFA of the present invention. FIG. 10A illustrates the reflector 23 provided on the input side of the EDF 20, like FIG. 2A. FIG. 10B illustrates the reflector 24 on the output side of the EDF 20, like FIG. 2B. The EDF 20 and reflectors 23 and 24 are the same as the first embodiment in FIGS. 2A and 2B. The EDFA according to the second embodiment is different from the first embodiment in that both of the EDFAs in FIG. 10A and FIG. 10B have an optical coupler 31 that supplies excitation light generated by the excitation light source 30 to an output terminal (the other end) of the EDF 20.

In the EDFA in FIG. 10A, the band of the amplified spontaneous emission occurring with back-pumping in the EDF 20 and moving backward from the input end to the input port IN is reflected by the reflector 23 and is input to the EDF 20 as the reflected light having the degree of polarization to be reduced as described above. In the EDFA in FIG. 10B, the band of the output light output through the output end of the EDF 20 and having passed through the optical coupler 31 is reflected by the reflector 24 and is input to the EDF 20 as the reflected light having the degree of polarization to be reduced as described above. The EDFA in FIG. 10A may include the optical filter 25 in FIG. 9.

Even the EDFA of back-pumping according to the second embodiment may acquire the similar effect as the first embodiment. However, comparing between the configuration in FIG. 10A having the reflector 23 on the input side and the configuration in FIG. 10B having the reflector 24 on the output, the EDFA in FIG. 10B according to the second embodiment has a higher effect of suppression of polarization hole-burning. This is because, in back-pumping, the amplified spontaneous emission moving backward from the EDF 20 to the input port IN is weak.

Figure 11A:
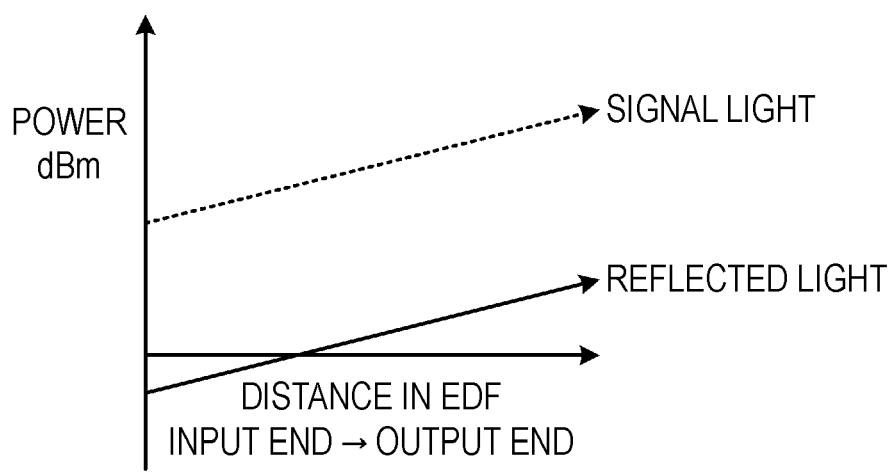
FIGS. 11A and 11B are graphs illustrating power of signal light and reflected light based on the distance in EDF.
Figure 11B:
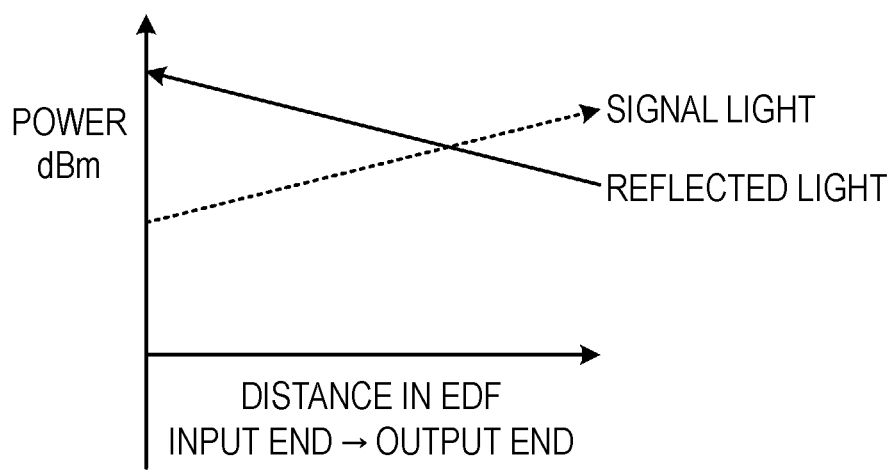

In other words, referring to the graphs as illustrated in FIG. 11 having the distance in the EDF 20 from the input end to the output terminal on the horizontal axis and the optical power on the vertical axis, the signal light power increases after amplification as the distance to the output terminal of the EDF 20 decreases as illustrated in FIGS. 8A and 8B. On the other hand, referring to FIG. 11A illustrating signal light and reflected light in the EDF 20 in FIG. 10A, the reflected light has weak power at the output terminal since the power of the backward amplified spontaneous emission before reflected by the reflector 23 is originally weak. Conversely, referring to FIG. 11B illustrating signal light and reflected light in the EDF 20 in FIG. 10B, the reflected light has higher power than the front-pumping in FIG. 2B. This is because, as seen in the process of occurrence of amplified spontaneous emission, in back-pumping, amplified spontaneous emission occurs strongly near the output terminal of the EDF 20 to which excitation light is input, and the strong amplified spontaneous emission is reflected by the reflector 24. Therefore, as seen from the comparison between both of them, the EDFA in FIG. 11B has a higher effect of suppression of polarization hole-burning because the reflected light power is strong near the output terminal of the EDF 20 with strong signal light power.

Figure 12:
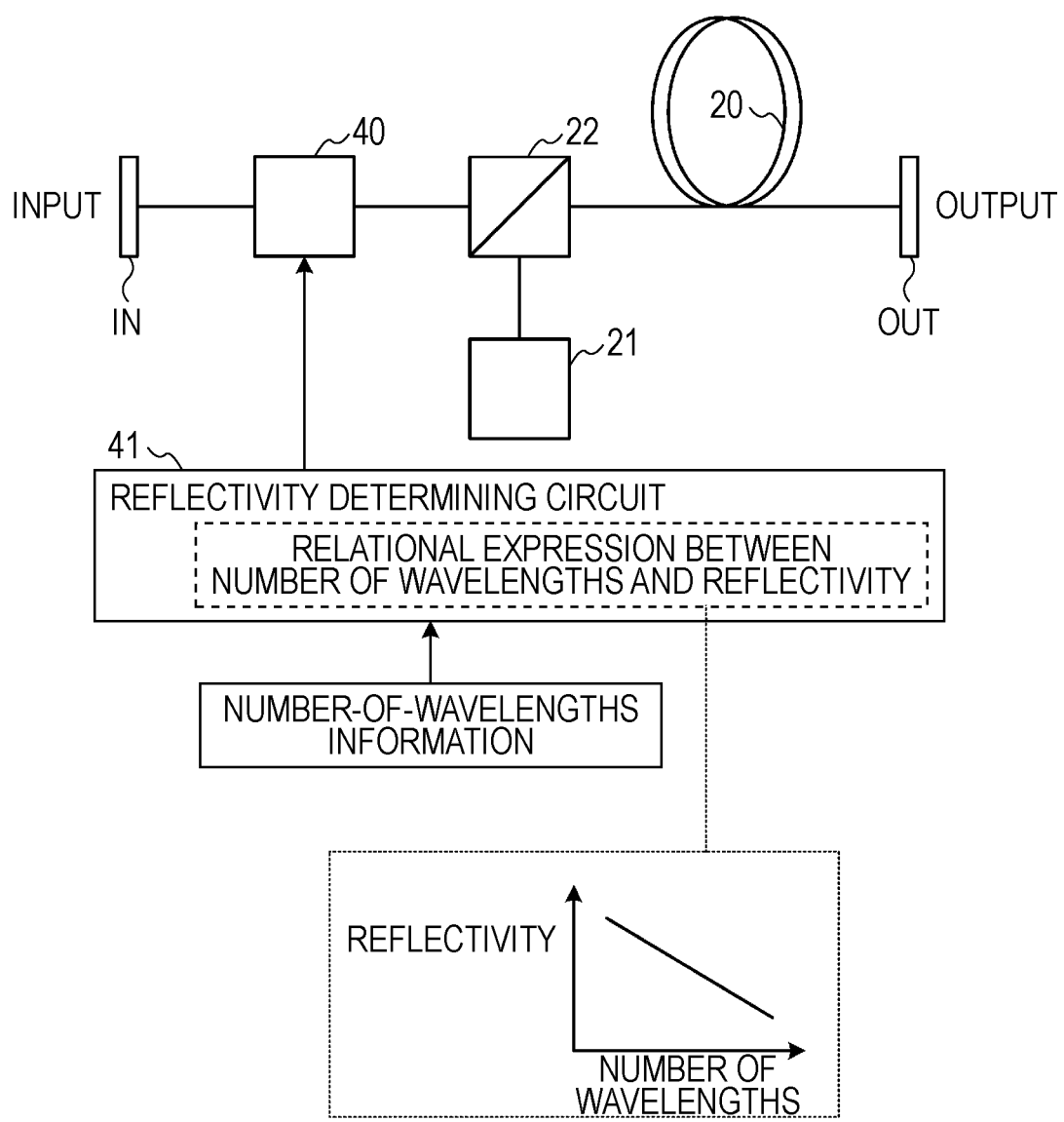
FIG. 12 is a block diagram illustrating an optical amplifier according to a third embodiment.

FIG. 12 illustrates a third embodiment of an EDFA of the present invention. The EDFA according to the third embodiment is front-pumping and includes the same EDF 20, excitation light source 21 and optical coupler 22 as those of the first embodiment illustrated in FIG. 2. Illustrating the third embodiment applied to the EDFA in FIG. 2A, for example, it may be applicable to any of the aforementioned configurations.

In FIG. 12, a reflector 40 is provided on the light path between the input port IN and the input end (one end) of the EDF 20 like first embodiment and reflects the band of the amplified spontaneous emission moving backward. The reflector 40 of the third embodiment has a reflecting medium with a variable reflectivity. The reflectivity is controlled by a controller 41 in accordance with the number of wavelengths of signal light contained in input light. The controller 41 includes a reflectivity determining circuit and determines the reflectivity of the reflector 40 on the basis of the number of wavelengths information on signal light transmitted from the transmitting station 10 or a relay station 13 in the previous stage (as in FIG. 1). The relationship between the reflectivity and the number of wavelengths may be input when the device is started, for example and may be set to a relationship of a linear function that reduces the reflectivity as the number of wavelengths increases as illustrated in FIG. 12.

The reflectivity of the reflector 40 is increased for a lower number of wavelengths with which polarization hole-burning occurs significantly and is reduced as the number of wavelengths of signal light increases. When signal light having many wavelengths is contained in input light, large excitation light power is required for amplifying signal light in the EDF 20. Also in consideration of the excitation light power involved in the amplification of reflected light, the excitation light source 21 may undesirably be a light source of high output. Therefore, for WDM light in which signal light of many wavelengths with an ignorable effect of polarization hole-burning, the reflectivity is lowered so that the required excitation light power may be reduced.

Figure 13:
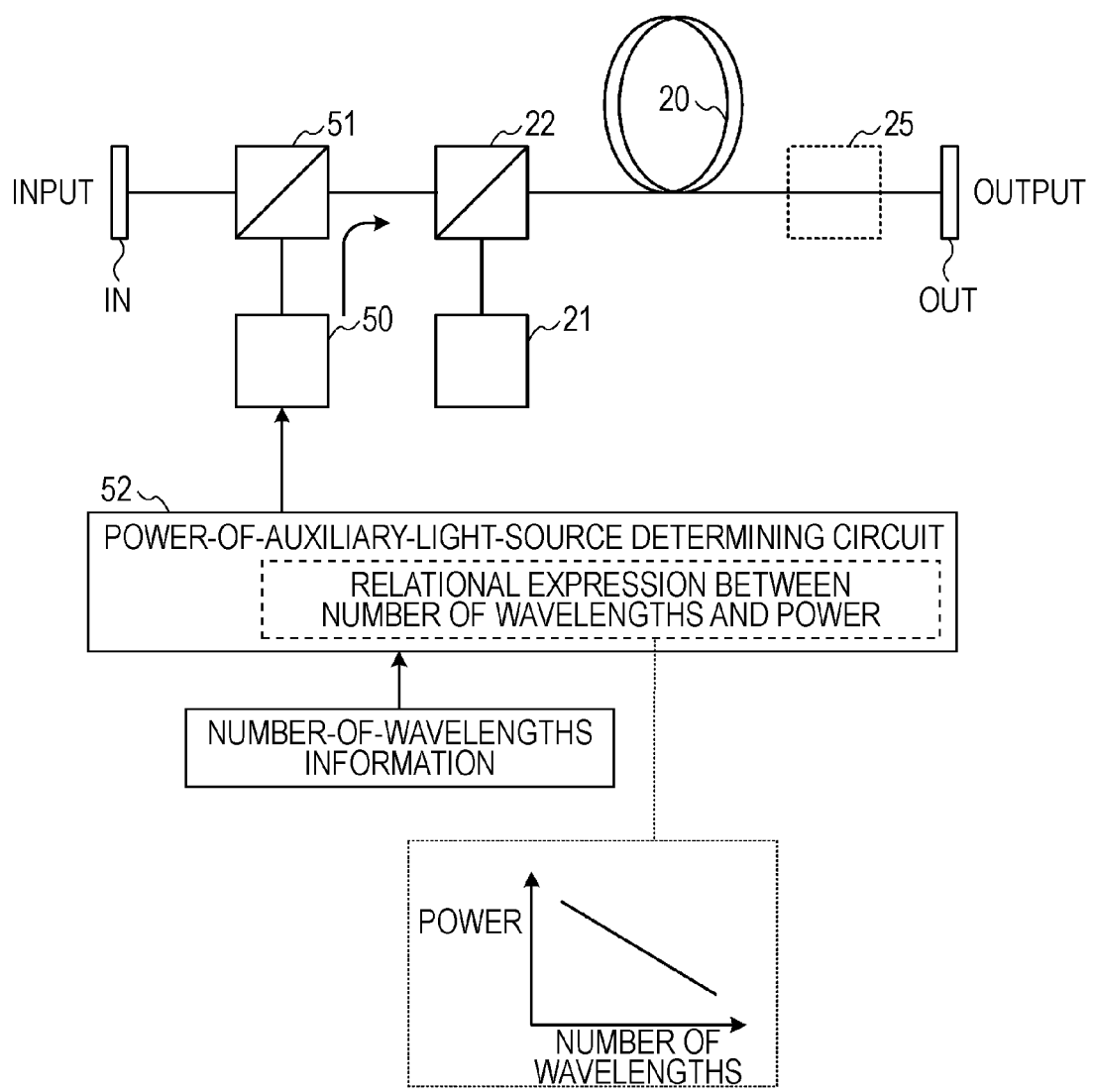
FIG. 13 is a block diagram illustrating an optical amplifier according to a fourth embodiment.

FIG. 13 illustrates a fourth embodiment of an EDFA according to the present invention. The EDFA according to the fourth embodiment is front-pumping and includes the same EDF 20, excitation light source 21 and optical coupler 22 as those of the first embodiment in FIGS. 2A and 2B. The fourth embodiment is an example of the EDFA in FIG. 2A but is also applicable to the EDFA in FIG. 2B.

The EDFA in FIG. 13 includes an auxiliary light generator that supplies auxiliary light to an input end (one end) of the EDF 20. The auxiliary light here is at the band having polarization hole-burning occurring in the EDF 20 near the wavelength of signal light contained in the input light. In other words, the auxiliary light generator includes an auxiliary light source 50 that generates auxiliary light and an optical coupler 51 that supplies auxiliary light to the input end of the EDF 20. The auxiliary light by the auxiliary light source 50 is the light at the same band as that of the reflected light by the reflector 23. The auxiliary light generated by the auxiliary light source 50 passes through the optical coupler 51 and reaches to the EDF 20 by rotating the polarization. Thus, it may become light nearly having the unpolarized state and be supplied to the EDF 20 without consideration of the polarized state when generated. Thus, similar effects as those of the embodiments may be acquired. The auxiliary light source 50 may be a laser diode, for example.

The auxiliary light generator may only include the auxiliary light source 50 and the optical coupler 51 but preferably further include a controller 52 that controls output power from the auxiliary light source 50 so that the power of auxiliary light may be controlled in accordance with the number of wavelengths of signal light contained in the input light.

The controller 52 has an auxiliary-light source power determining circuit and determines the output power from the auxiliary light source 50 on the basis of the number of wavelengths information on signal light transmitted from the transmitting station 10 or a relay station 13 in the previous stage (as in FIG. 1). The relationship between the power and the number of wavelengths may be input when the device is started, for example and may be set to a relationship of a linear function that reduces the power as the number of wavelengths increases as illustrated in FIG. 13. The reason why the relationship is used is as described above according to the third embodiment.

The EDFA of the fourth embodiment may also include an optical filter 25 on the light path between the output terminal and output port OUT of the EDF 20 as indicated by the broken square in FIG. 13. The optical filter 25 blocks the transmission of light at a band of auxiliary light. The optical filter 25 is provided for the reason described above.

Figure 14:
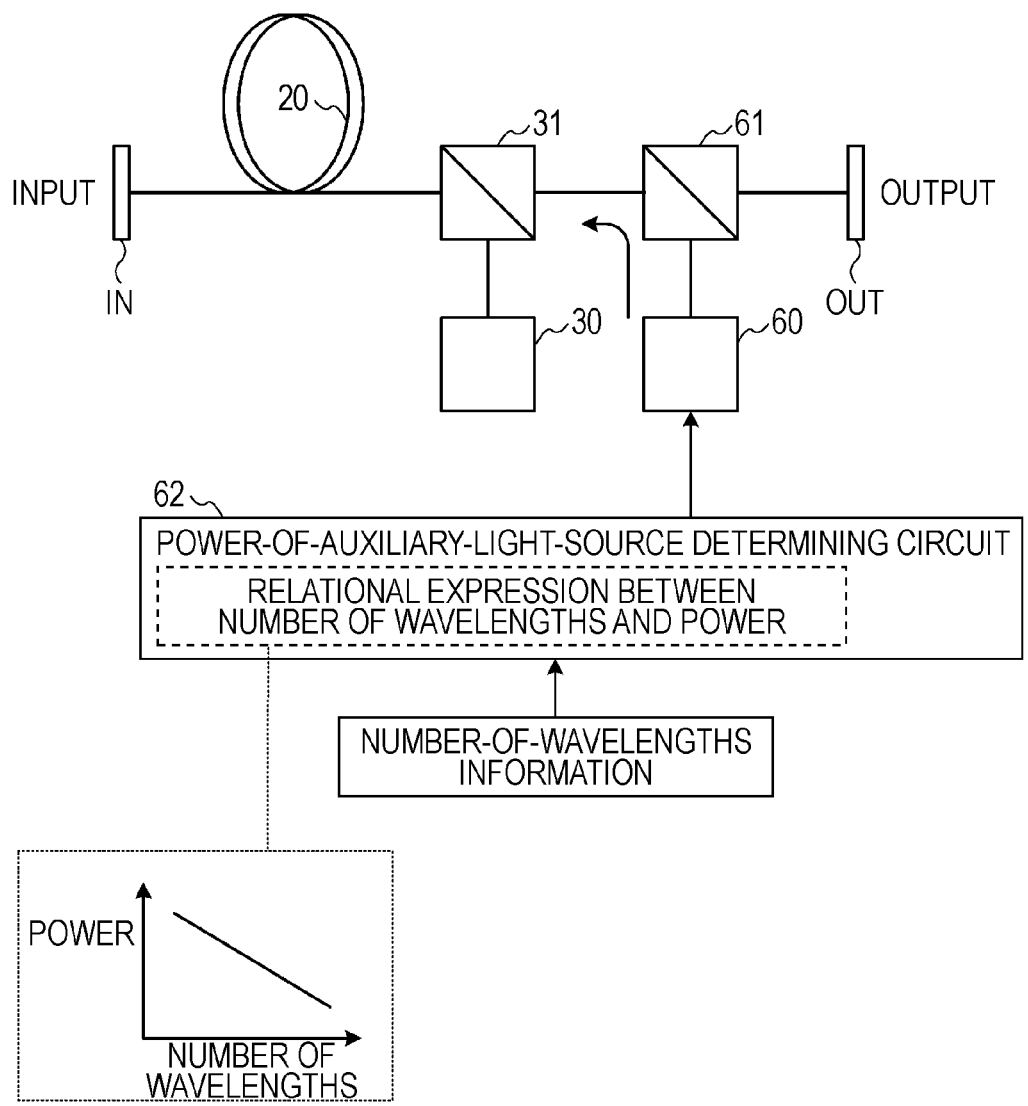
FIG. 14 is a block diagram illustrating an optical amplifier according to a fifth embodiment.
Figure 15A:
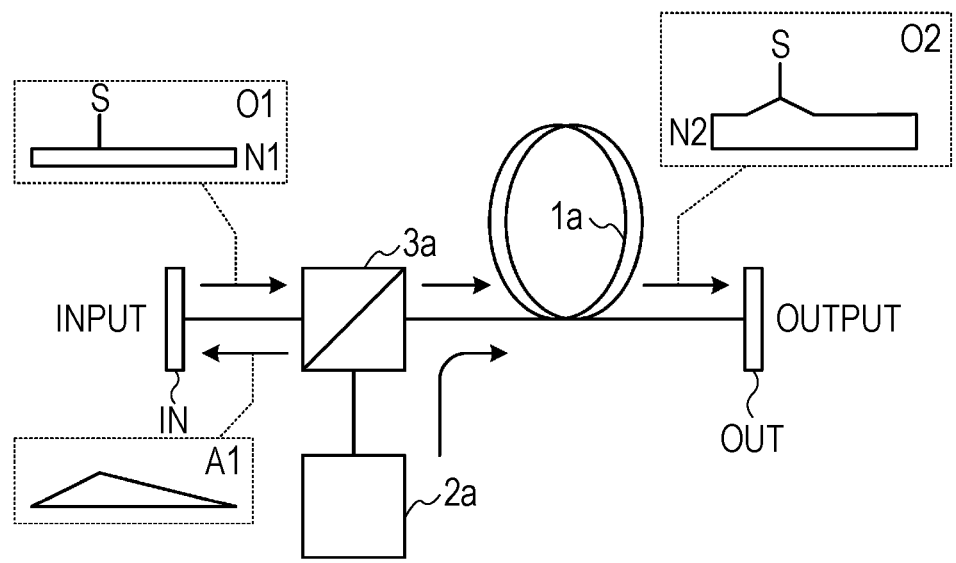
FIGS. 15A and 15B are block diagrams of an optical amplifier according to a related art.
Figure 15B:
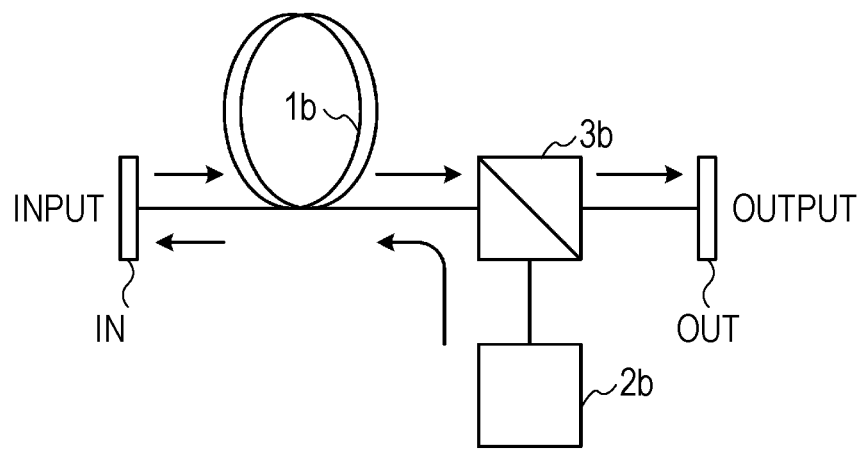

FIG. 14 illustrates a fifth embodiment of an EDFA according to the present invention. The EDFA of the fifth embodiment is back-pumping and includes the same EDF 20, excitation light source 30 and optical coupler 31 as those of the second embodiment in FIGS. 10A and 10B. The fifth embodiment is an example of the EDFA in FIG. 10B but is also applicable to the EDFA in FIG. 10A.

The EDFA in FIG. 14 includes an auxiliary light generator that supplies the same auxiliary light as that of the fourth embodiment to an output end (the other end) of the EDF 20. In other words, the auxiliary light generator includes an auxiliary light source 60 that generates auxiliary light and an optical coupler 61 that supplies auxiliary light to the output end of the EDF 20. The auxiliary light by the auxiliary light source 60 is the light at the same band as that of the reflected light by the reflector 24. The auxiliary light generated by the auxiliary light source 60 having a laser diode, for example, passes through the optical coupler 61 and reaches to the EDF 20 by rotating the polarization like the fourth embodiment. Thus, it may become light nearly having the unpolarized state and be supplied to the EDF 20 without consideration of the polarized state when generated. Thus, similar effects as those of the embodiments may be acquired.

The auxiliary light generator of the fifth embodiment may also only include the auxiliary light source 60 and the optical coupler 61 but preferably further include a controller 62 that controls output power from the auxiliary light source 50 so that the power of auxiliary light may be controlled in accordance with the number of wavelengths of signal light contained in the input light. The controller 62 has the same function as that of the controller 52 of the fourth embodiment having an auxiliary light source power determining circuit.

Having described according to the embodiments front-pumping and back-pumping EDFs, the present invention is also applicable to bidirectional pumping.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical amplifier comprising:
   a rare-earth doped optical fiber for receiving input light through one end and outputting output light through another end, the input light being input from an input port;
   an excitation light source for generating excitation light;
   an optical coupler for supplying the generated excitation light to the one end and/or the another end of the rare-earth doped optical fiber; and
   a reflector for reflecting an amplified spontaneous emission light out of a signal band traveling in opposite direction to the input light, the amplified spontaneous emission light being generated in the rare-earth doped optical fiber, wherein
   a wavelength of the input light is in a part of C-band, and
   the reflector reflects a light component of a part of a band in an amplified spontaneous emission, the part of the band being shorter-wavelength side than the wavelength of the input light.

2. The optical amplifier according to claim 1, wherein
   a range of the part of the band in the amplified spontaneous emission is −6 nm shorter-wavelength side than the wavelength of the input light, and does not contain the wavelength of the input light.

3. The optical amplifier according to claim 1, wherein the optical coupler is provided on a light path between the input port and the one end of the rare-earth doped optical fiber.

4. The optical amplifier according to claim 1, wherein the optical coupler is provided on a light path between an output port and the another end of the rare-earth doped optical fiber.

5. The optical amplifier according to claim 1, wherein the reflector is provided on a light path between the input port and the one end of the rare-earth doped optical fiber.

6. The optical amplifier according to claim 5, further comprising:
a second reflector is provided on a light path between an output port and the another end of the rare-earth doped optical fiber, and reflects a light component of a part of a band in an amplified spontaneous emission that is generated in the rare-earth doped optical fiber.

7. The optical amplifier according to claim 1, wherein the reflector is provided on a light path between an output port and the another end of the rare-earth doped optical fiber.

8. The optical amplifier according to claim 7, further comprising:
a second reflector is provided on a light path between the input port and the one end of the rare-earth doped optical fiber, and reflects a light component of a part of a band in an amplified spontaneous emission that is generated in the rare-earth doped optical fiber.

9. An optical amplifier comprising:
a rare-earth doped optical fiber for receiving input light through one end and outputting output light through another end, the input light being input from an input port;
an excitation light source for generating excitation light;
an optical coupler for supplying the generated excitation light to the one end and/or the another end of the rare-earth doped optical fiber;
a reflector for reflecting an amplified spontaneous emission light out of a signal band traveling in opposite direction to the input light, the amplified spontaneous emission light being generated in the rare-earth doped optical fiber; and
a controller for determining the reflectivity of the reflector on the basis of the number of wavelengths information on signal light transmitted from a transmitting station or a relay station in a previous stage,
wherein the reflector includes a reflecting medium with a variable reflectivity.

* * * * *